(No Model.)
A. G. HOLCOMBE.
REVERSE CURRENT INTERCEPTOR FOR ELECTRIC CIRCUITS.
No. 343,373. Patented June 8, 1886.
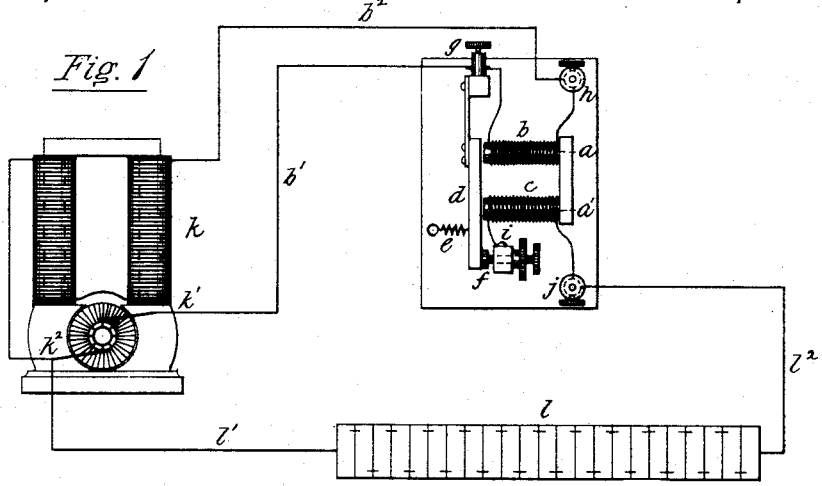
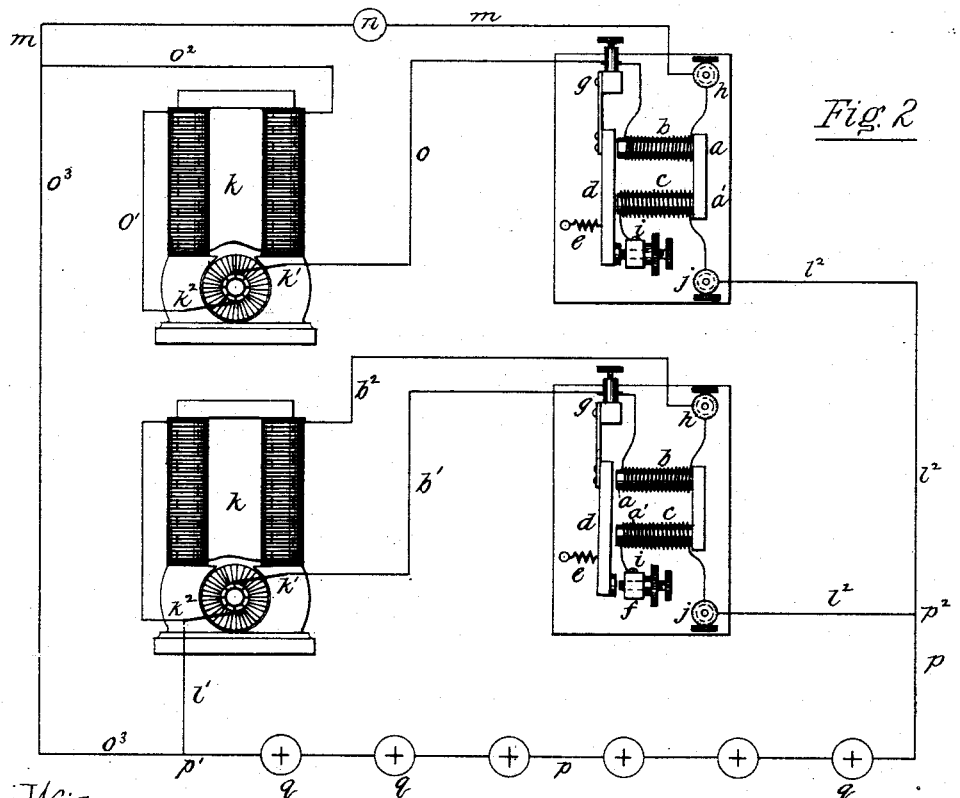
Witnesses
H. D. Williams
Chas. S. Watson
Alfred G. Holcombe
Inventor
per Alfred Shicloth,
Atty.

UNITED STATES PATENT OFFICE.

ALFRED G. HOLCOMBE, OF NEW YORK, N. Y., ASSIGNOR TO THE EQUITABLE ELECTRIC COMPANY, OF SAME PLACE.

REVERSE-CURRENT INTERCEPTOR FOR ELECTRIC CIRCUITS.

SPECIFICATION forming part of Letters Patent No. 343,373, dated June 8, 1886.

Application filed December 21, 1885. Serial No. 186,301. (No model.)

*To all whom it may concern:*

Be it known that I, ALFRED G. HOLCOMBE, a citizen of the United States, residing at New York, county and State of New York, have invented a certain new and Improved Reverse-Current Interceptor for Electric Circuits, of which the following is a specification.

In many applications of electricity where dynamo-electric machines are used as the source of the current, reverse or counter currents are often set up, which have the effect of changing the polarity of and sometimes disabling the dynamo-electric machines—as, for instance, in charging accumulators or storage-batteries; and in electrolytic operations a reverse current is caused to flow through the dynamo-electric machine when the electro-motive force of the accumulators or the electrolytic bath exceeds that of the dynamo-electric machine; and where two or more dynamo-electric machines are connected together in multiple arc to supply electric currents to a common main circuit, in which it is important to maintain a certain electro-motive force, and the electro-motive forces of the individual circuits vary, then the electro-motive force in the common main does not exceed that of the generator producing the weaker current. Now, this invention embraces a simple and efficient device, which I have designated a "reverse-current interceptor," adapted to prevent the bad effects of reverse or counter currents on dynamo-electric machines, and also adapted to cut out the one of a set of dynamo-electric machines connected together in multiple arc when its electro-motive force falls below that of the other dynamo-electric machines.

My improved reverse-current interceptor consists of an automatic cut-out having independent exciting-coils on the core or cores of an electro-magnet, one of which is included in a shunt from the main circuit of the dynamo-electric machine and the other coil in the main or charging circuit. The pole or poles of the magnet act upon an armature, which is thereby caused to close the main circuit. The two coils are so wound and proportioned as to their energizing effects on the magnet that the main circuit is closed by the current flowing through the shunt-circuit. When the machine is actuated to generate a current having the electro-motive force it is desired the cut-out shall work under, the main current also then assists to hold the armature; but the instant a reverse current is set up whose energy is sufficient to oppose the main current the polarity of the magnet of the interceptor is changed, due to the reverse current flowing by the main-circuit coil, and the attractive force of the shunt-circuit coil neutralized, thus allowing the armature to fall back and break the main circuit before the reverse or counter current affects the dynamo-electric machine. Now, as soon as the dynamo-electric machine reaches a condition to generate a current of electro-motive force in excess of or equal to that of any reverse current, then the energizing effects of the coil in the shunt-circuit is sufficient to again cause the magnet to attract the armature and close the main circuit.

Figure 1 of the accompanying drawings represents my improved reverse-current interceptor applied to a dynamo-electric machine arranged to charge accumulators. Fig. 2 shows the application of my invention as a current-controller or cut-out to dynamo-electric machines arranged in multiple arc.

In a practical form adapted to most purposes my reverse-current interceptor comprises a horseshoe electro-magnet, $a\,a'$, having independent coils of insulated wire $b$ and $c$, an armature, $d$, adjusting-spring $e$, adjustable contact-stop $f$, and binding-posts $g\,h\,i\,j$. In Fig. 1 it is shown applied to a shunt-wound dynamo-electric machine, $k$, arranged to charge a set of accumulators or storage-batteries, $l$. The coil $b$ on the limb $a$ of the magnet is included in the field-magnet shunt-circuit by being connected to the binding-posts $g$ and $h$, which are respectively connected to the brush $k'$ of the dynamo by the line $b'$ and one end of the field-magnet coils by the line $b^2$. The other end of the field-magnet coils is joined to the brush $k^2$. The main or charging circuit comprises the line $l'$ from the brush $k^2$ to one end of the accumulators $l$, the line $l^2$ from the other end of the accumulators to the post $j$, the coil $c$ on the limb $a'$ of the magnet connected between the posts $i$ and $j$, the adjustable contact-stop $f$, fitted in the post $i$, the armature $d$, joined by a flexible conductive connection to the post $g$, and the line $b'$ from the post $g$ to the brush $k'$.

The operation of the instrument under these circumstances is as follows: The main or charging circuit is broken between the armature $d$ and stop $f$ when the electro-motive force of the dynamo machine is below the normal. The spring $e$ is so adjusted that the armature $d$ is attracted by the magnet, due to the current flowing through the coil $b$ in the shunt-circuit, when the dynamo-machine $k$ generates a current above the minimum or lowest working electro-motive force of the accumulators, thereby closing the main circuit at $d$ and $f$. The main current now flows through the accumulators in direction to charge them, and also through the coil $c$, which is so arranged that its energizing effect on the limb $a'$ assists the coil $b$ in holding the armature $d$ up to the magnet. Now, if, from loss of speed due to the driving-belt slipping, or from any other cause, the electro-motive force of the machine does not exceed that of the counter or discharging current of the accumulators, then the flow of the main current is stopped at $g$; but before the electro-motive force of the machine falls sufficiently to allow the reverse current to pass through it the magnet $a$ $a'$ loses its power by reason of the reverse current flowing through the coil $c$ before it reaches its point of junction with the permanently-closed circuit of the machine, and the main circuit is broken at $f$ by the retraction of the armature $d$, thus providing a perfect protector for dynamo-electric machines where the motive power is variable—such as, for instance, that derived from wind-motors—for by the employment of this reverse-current interceptor the most variable and irregular sources of power may be utilized to drive dynamo electric machines, avoiding the necessity of constant personal attendance.

When my reverse-current interceptor is applied to a series-wound dynamo-electric machine, the plan shown in the upper part of Fig. 2 may be adopted. The coil $b$ is placed in a shunt, $m$, in which is also included a resistance, $n$, the armature $d$ and coil $c$ being in the main-line circuit $l^2$ $o$ $o'$ $o^2$ $o^3$ of the dynamo electric machine, with the field-magnet coils thereof. The resistance $n$ is so proportioned in relation to the main circuit that only a small portion of the current, sufficient to energize the magnet $a$ $a'$ to attract its armature, flows through the coil $b$. In this Fig. 2, $p$ represents a working-circuit supplied with electric currents from dynamo-electric machines in multiple arc, in which circuit it is desired to maintain a constant electro-motive force to operate the translating devices $q$ $q$, which, for instance, may represent arc lamps. Two dynamo-electric machines, $k$ $k$, only are shown, the lower one, with its reverse-current interceptor and circuits, being in all respects similar to that shown in Fig. 1. The line-wires $o^3$ and $l'$ of the two machines join together at $p'$ of the working-circuit, and the line-wires $l^2$ $l^2$ from the binding-posts $j$ $j$ of the reverse-current interceptors of the two machines join together at the other end, $p^2$, of the working-circuit. The operation of the reverse-current interceptors will in this case be readily understood from the preceding description. It is evident that so long as the electro-motive forces of the currents generated by the machines are equal at the points $p'$ and $p^2$ no interference will occur between the machines; but should the electro-motive forces of the machines become unequal by a loss of generating capacity of one of the machines, due to its driving-belt slipping or from any other cause, then the current from the machine having the higher electro-motive force will react on the reverse-current interceptor of the deficient machine and instantly break its circuit in the manner before described. This action is shown as having occurred in the lower circuit of the multiple arcs in Fig. 2, the working-line being now supplied solely by the upper machine, but with a current having the normal working electro-motive force. Now, as soon as the lower machine is in condition to generate a current whose electro-motive force equals that of the upper machine, its circuit is again closed, so that when variations in the generating qualities of dynamo-electro machines in multiple arc occur, as now often happens from numerous causes, the only effect felt in the working-circuit, if such machines are provided with my reverse-current interceptors, will be a change in the ampères supplied, the volts or electro-motive force of the current remaining constant, which is an important consideration in many of the applications of electricity.

Having now described the nature and some of the applications of my invention, the essential features of which are two independent coils on an electro-magnet, one placed in a permanently-closed shunt and the other one in the main circuit of a dynamo-electric machine, with a circuit-breaker in the main circuit actuated by the armature of the electro-magnet, I do not wish to confine myself to the particular construction shown, as it is obvious that modifications may be made embracing the principles of construction and operation of my reverse-current interceptor.

What I claim, and desire to secure by Letters Patent, is—

1. In an automatic cut-out or reverse-current interceptor, the combination, with a dynamo-electric machine, of an electro-magnet having independent exciting-coils, one included in a shunt-circuit and the other one included in the main circuit of the machine, and a circuit-breaker in the main circuit actuated by the moving armature of the electro-magnet.

2. The combination, with a dynamo-electric machine and an accumulator, of a reverse-current-interceptor comprising a circuit-breaker in the main or charging circuit, a moving armature constructed and arranged to actuate the circuit-breaker, an electro-magnet having two independent exciting-coils, one included in a shunt-circuit and the other one in the main or charging circuit, said coils being so proportioned as to their energizing effect on the electro-magnet that the current in the shunt-circuit coil causes the magnet to attract the armature and close the main circuit when the electro-motive force of the machine is at its working limit or exceeds that of the accumulators, and that a reverse current is caused to flow to the coil in the main circuit, neutralizing the energizing effect of the current in the shunt-circuit coil, and allowing the circuit-breaker to be opened by the retraction of the armature when the counter electro-motive force of the accumulators equals or exceeds that of the machine.

In witness whereof I have hereunto set my hand this 18th day of December, 1885.

ALFRED G. HOLCOMBE.

Witnesses:
ALFRED SHEDLOCK,
H. D. WILLIAMS.